(12) United States Patent
Shepherd et al.

(10) Patent No.: US 6,980,777 B2
(45) Date of Patent: Dec. 27, 2005

(54) SMART POUCH COVER FOR MOBILE DEVICE

(75) Inventors: Robert Shepherd, Tarzana, CA (US); Ronald J. Lander, Jr., Calabasas, CA (US)

(73) Assignee: Nokia Corporation, Espoo (FI)

( * ) Notice: Subject to any disclaimer, the term of this patent is extended or adjusted under 35 U.S.C. 154(b) by 470 days.

(21) Appl. No.: 10/209,795

(22) Filed: Jul. 31, 2002

(65) Prior Publication Data

US 2004/0203486 A1 Oct. 14, 2004

(51) Int. Cl.[7] .............................................. H04B 1/38
(52) U.S. Cl. ............. 455/90.3; 455/575.8; 379/433.11; 379/437
(58) Field of Search .......................... 455/575, 90, 301, 455/90.3, 575.1, 575.4, 575.8, 347–349, 455/351; 345/174; 379/433.11, 433.12, 437; 361/600, 625

(56) References Cited

U.S. PATENT DOCUMENTS

| | | | |
|---|---|---|---|
| 5,733,023 A | 3/1998 | Lee | |
| 6,701,159 B1 * | 3/2004 | Powell | 455/575.8 |
| 6,731,913 B2 * | 5/2004 | Humphreys et al. | 455/90.3 |
| 6,822,640 B2 * | 11/2004 | Derocher | 345/173 |
| 2001/0049262 A1 * | 12/2001 | Lehtonen | 455/41 |
| 2002/0136557 A1 * | 9/2002 | Shimamura | 396/535 |
| 2003/0036362 A1 * | 2/2003 | Buesseler et al. | 455/90 |
| 2004/0204000 A1 * | 10/2004 | Dietrich et al. | 455/550.1 |

FOREIGN PATENT DOCUMENTS

| | | |
|---|---|---|
| DE | 29909231 U | 10/1999 |
| GB | 2312792 A | 11/1997 |
| GB | 2338832 A | 12/1999 |
| WO | WO 02/088914 A1 | 11/2002 |

* cited by examiner

Primary Examiner—Lee Nguyen
(74) Attorney, Agent, or Firm—Alston & Bird LLP

(57) ABSTRACT

A protective enclosure for a mobile module. The enclosure includes a pouch having a plurality of walls. The walls define a module cavity, and the module cavity is configured to slideably receive the mobile module. The pouch may be constructed of shock absorbent and/or flexible materials, such as rubber, woven textiles, and soft plastics. The mobile module is removable from the pouch, and a connector may be used to electrically couple the pouch with the mobile module.

20 Claims, 3 Drawing Sheets

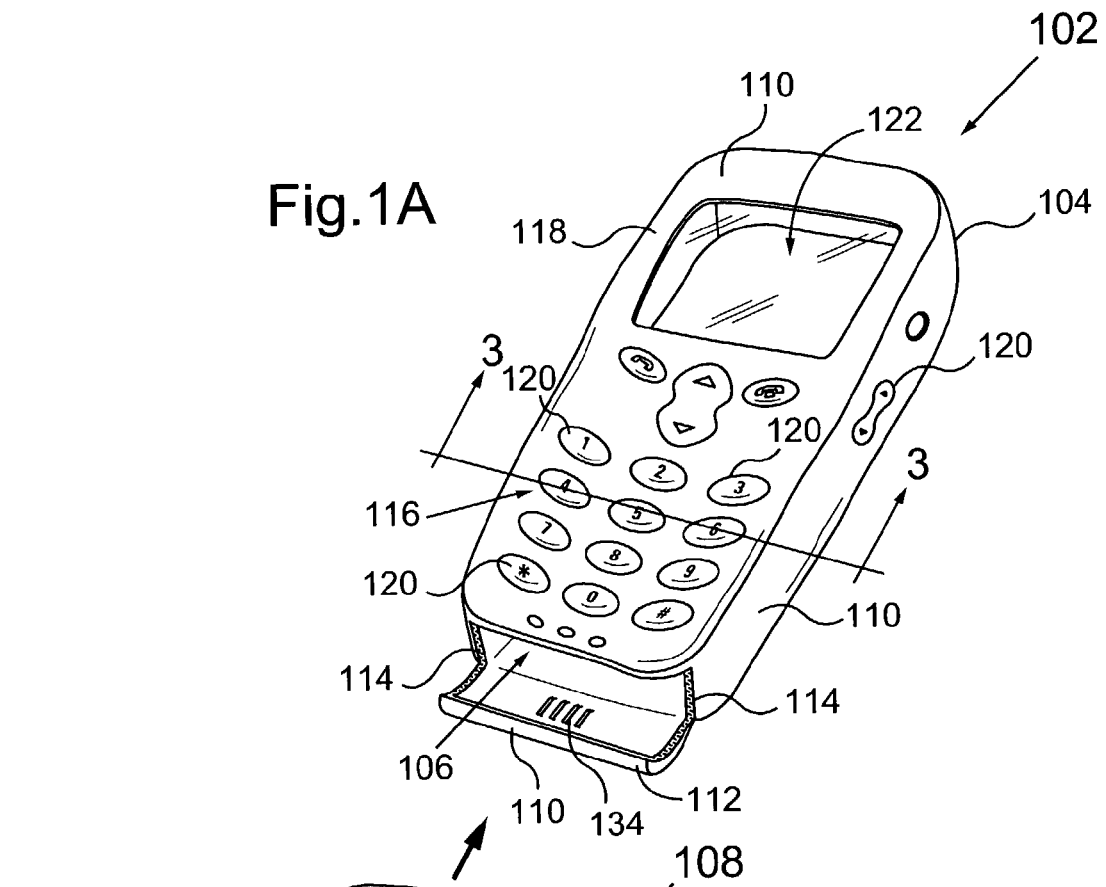
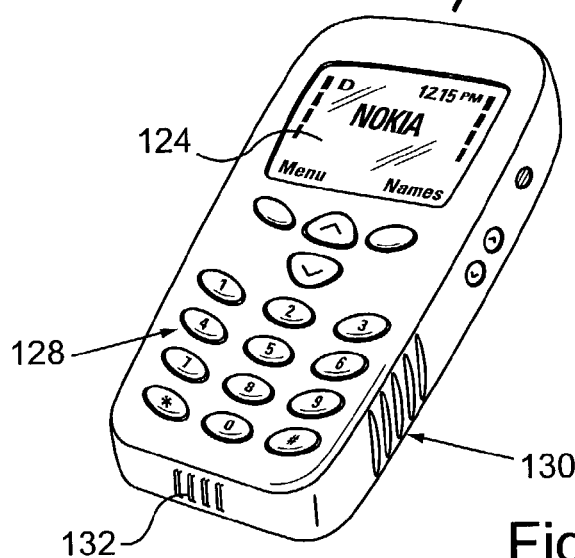
Fig.1A
Fig.1B

SMART POUCH COVER FOR MOBILE DEVICE

FIELD OF THE INVENTION

The present invention relates generally to portable electronic devices, and more specifically to a pouch enclosure for cellular telephones and similar portable devices.

BACKGROUND

In most modern societies, mobile phones are used by people of all ages and walks of life. Once owned and carried by the affluent or persons in specialized occupations that both required and supplied them, mobile phones are now owned by many, and sometimes even by the majority of a given population.

There are many reasons for the widespread use of mobile phones. The first and foremost reason is technology advancements. The development of a cellular system of organizing radio traffic has made it possible to subscribe thousands of customers in a single metropolitan area. Improved multiplexing and modulation techniques have contributed to the ability to handle vast numbers of customers. Coverage has improved as well. That is, the amount of geographic areas serviced by cellular phone companies has increased. At the same time, the cost of mobile phones and subscriptions to a mobile communication network have fallen and made mobile phone use affordable. Improved technology has also led to the development of ever smaller and easier to use phones. These advancements have spurred the mobile phone market, which in turn, fuels more advancement in the mobile phone field.

Some of these improvements, however, present new challenges to mobile phone engineers. The small phone designs of today force developers to economize the size and weight of protective casing components. In other words; to satisfy consumer demands for more portable and lightweight phones, the instruments' ability to absorb shock and resist deformation that might damage internal parts is compromised. In addition, mobile phones are increasingly being used in environments hostile to the sophisticated electronic technology of mobile phones. This is in contrast with the past, when a limited number of rather expensive phones having limited capabilities were mostly used by professionals, and then frequently from a fixed automobile installation. Some prior mobile phones were truly mobile, but were carried about in large protective cases. The small, lightweight, and relatively inexpensive phones of present, however, are owned by customers from all walks of life, and with occupations or avocations that take them and their phones into industrial plants, construction sites, and all manner of outdoor environments. Yet the small, modern phones of present are often less, not more rugged, and at the same time less able to resist hazards like dust and dirt.

Most modern mobile phone enclosures are composed of multiple covers; typically a front cover and a back cover secured to an internal frame. Despite the availability of alternate materials, these covers are often constructed of hard plastic material. In many ways, plastics are well suited as enclosures of portable electronic devices. Plastic (meaning thermoplastic) materials flow when heated to a certain temperature, and can be molded into precise shapes that they retain when cooled. Being non-metallic, plastics are relatively lightweight, non-conducting, and nonmagnetic, which are often favorable properties in connection with portable electronic device enclosures. "Hard" plastic materials resist any deformation at normal operating temperatures (those that human operators will tolerate). Plastics cannot be significantly bent or stretched without application of permanent deformation or failure force. They are strong enough, however, that a substantial force is required to bring such failure about.

One drawback of hard plastic covers is their lack of ability to absorb shock when an abrupt force is applied to the mobile device, such as dropping the device. This type of impact may cause the enclosure to break or may transfer the force to the device's sensitive internal parts. Either outcome generally results in sever damage to the mobile phone. To make up for the enclosure's inability to absorb shock, a separate cover is sometimes used. While separate covers are useful in some ways, they are often under utilized because they hinder the telephone's convenient use and are cumbersome to carry and install.

SUMMARY OF THE INVENTION

Accordingly, the present invention provides a single interchangeable pouch that envelops the entire mobile device, as opposed to two or more covers. The pouch may be constructed from various shock absorbing and elastic materials, and can include electronic components in communication with internal device circuitry.

Thus, one aspect of the present invention is a protective enclosure for a mobile module. The enclosure includes a pouch having a plurality of walls. The walls define a module cavity, and the module cavity is configured to slideably receive the mobile module. The mobile module is removable from the pouch. A connector is configured to electrically couple the pouch with the mobile module.

Another aspect of the invention is a mobile telephone. The mobile telephone includes a mobile module having a micro controller and a transceiver. The mobile telephone further includes a pouch with a connector and a plurality of walls that define a module cavity. The module cavity is configured to slideably receive the mobile module, and the mobile module is removable from the pouch. The connector is configured to electrically couple the pouch with the mobile module.

The foregoing and other features, utilities and advantages of the invention will be apparent from the following more particular description of various embodiments of the invention as illustrated in the accompanying drawings.

BRIEF DESCRIPTION OF THE DRAWINGS

FIG. 1A shows an exemplary enclosure contemplated by the present invention.

FIG. 1B shows an exemplary mobile module contemplated by the present invention.

DETAILED DESCRIPTION OF THE INVENTION

Figure 2:
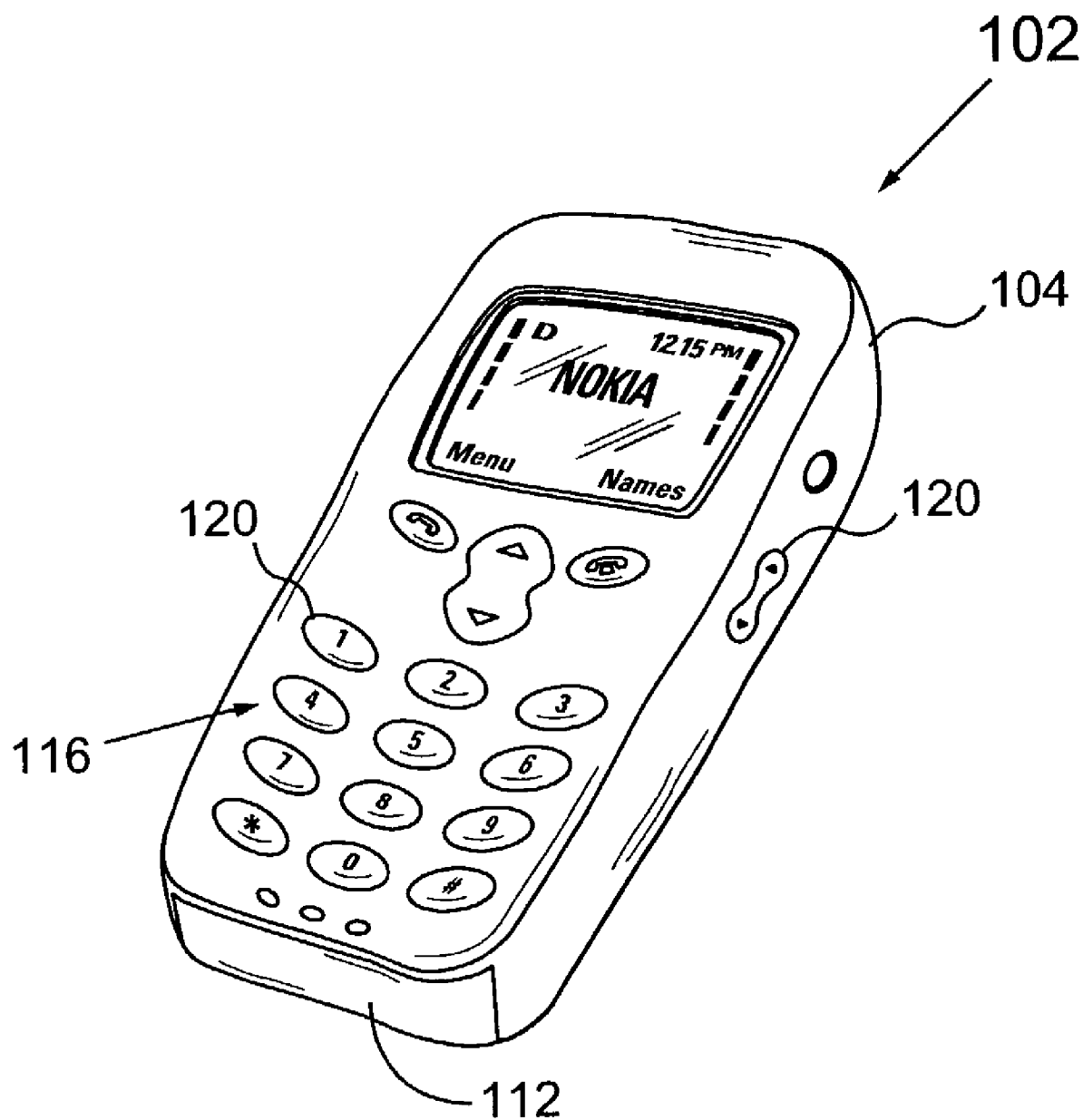
FIG. 2 shows the mobile module contained within the enclosure of the present invention.

As detailed below, the present invention is a novel enclosure for a mobile device, such as a cellular phone. The invention is equally suitable, however, for other similar devices such as personal digital assistants (PDAs), web-enabled phones, and the like. For convenience, these and like devices are referred to herein generically as "mobile stations" and "mobile devices". The invention is described with reference to FIGS. 1–3. When referring to the figures, like structures and elements shown throughout are indicated with like reference numerals.

FIG. 1A shows enclosure 102 contemplated by the present invention. The enclosure 102 consists of a flexible pouch 104 that defines a module cavity 106. The module cavity 106 is configured to receive a mobile module 108 (shown in FIG. 1B), and the mobile module 108 is designed to slide in and out of module cavity 106. As described in more detail below, the pouch 104 beneficially surrounds the mobile module 108 and protects it from foreign particles, as well as shock and other physical force.

The pouch 104 includes a plurality of walls 110 that define the module cavity 106. In one embodiment of the invention, a bottom access wall 112 provides an opening to the module cavity 106. The access wall 112 can be situated in an open position, as shown in FIG. 1A, or in a closed position, as shown in FIG. 2. It is contemplated that the access wall 112 is biased to the closed position to ensure the mobile module 108 does not unintentionally slide out of the pouch 104 when in transit. In addition, the access wall 112 may include one or more fasteners, such Velcro hook and loop fasteners 114, to lock the access wall 112 in the closed position.

In one embodiment of the invention, the pouch 104 includes a keypad 116 located, at least partially, about a front interface wall 118 for entry of user input. The keypad 116 contains a plurality of push keys 120 that, when pressed, complete an electrical circuit indicating user input. As described below, the keypad 116 may include a portion of the electrical circuit, or may simply translate the push key motion onto the mobile module 108. It is contemplated that the interface wall 118 may include touch pads, joysticks, proximity sensors, and other known user input devices.

The interface wall 118 may additionally define a display window 122 to permit viewing of the device display 124 (see FIG. 1B). It is contemplated that the display window 122 may be a cut-out portal on the interface wall 118, or may include a transparent covering that provides the display 124 protection against scratching and foreign particles.

As indicated above, the mobile module 108 is shown in FIG. 1B, and includes important elements of the mobile device. In a cellular phone application, for example, the mobile module 108 may include a micro controller, a printed circuit board, a display 124, a battery, a microphone, a keyboard assembly 128, a speaker, a radio antenna, and other components known to those skilled in the art. The mobile module 108 is shaped to fit snuggly into the module cavity 106 and may include surface features 130, such as ridges or dimples, to help it remain within the cavity 106 while in motion.

In a particular embodiment of the invention, the mobile module 108 is electrically coupled to the pouch 104 by means of a module connector 132 and a pouch connector 134 (see FIG. 1A). The particular connectors 132 and 134 utilized by the invention is a matter of design choice, and may include a pogo pin connector, leaf spring contacts, a zebra strip connector, and other connectors known to those skilled in the art. As discussed in more detail below, the connectors 132 and 134 allow for power and data signals to flow between electrical components within the pouch 104 and the mobile module 108.

In FIG. 2, the mobile module 108 is shown contained within the enclosure 102 of the present invention. As mentioned above, the access wall 112 is depicted in the closed position and securely seats the mobile module 108 within the module cavity 106. As also mentioned above, the access wall 112 may be biased in the closed position to ensure closure of the pouch 104 and retention of the mobile module 108. Biasing may be achieved using elastic material about the access wall 112 or using one or more springs attached to the access wall 112. In one embodiment of the invention, the pouch 104 is constructed, as least partially, from elastic or stretchable material that form-fits the mobile module 108 when inserted.

The pouch 104 advantageously surrounds the mobile module on all sides, thereby helping protect the mobile device against shock and impacts received from various directions and angles. Furthermore, it is contemplated that the pouch 104 may be constructed from shock absorbent material, such as rubber or soft plastic to further protect the device. Other natural and synthetic shock absorbing materials known in the art may also be used by the present invention.

In a particular embodiment of the invention, the pouch 104 is constructed from a single piece of material. Such an embodiment can simplify the manufacturing process of the pouch 104 and can reduce manufacturing costs by eliminating the need for glues, screws, and other attachment means. In addition, the single piece construction can increase the pouch's integrity by eliminating seams and gaps within the pouch 102. The elimination of seams and gags can also increase the mobile device's useful life by preventing dust, moisture, and other foreign particles from entering the mobile device.

It is further contemplated that the pouch 104 may be constructed, at least partially, from woven textiles. Such woven textiles may include elastic materials, resulting in a stretchable pouch design. Moreover, the textile fabric may incorporate electricity-conducting thread to deliver power and data signals between the pouch 104 and the mobile module 108. For example, the keypad 116 may include electricity-conducting thread that completes an electric circuit when a key 120 is activated.

In one embodiment of the invention, pouches may be interchanged according to the user's needs. For instance, a particular pouch may include a "hotkey" button on the keypad to output baseball statistics on the display. The baseball pouch, for example, can be used when the mobile device is taken to baseball games. Another pouch, for example, may include a hotkey on the keypad to show current time at a different time zone. Thus, different pouches may provide different functionality and features for the same mobile module. The swappable pouches may include an identification code read by the mobile module to identify which particular pouch is being used. In this manner, the swappable pouches can help the user personalize the mobile device to his or her requirements.

Figure 3:
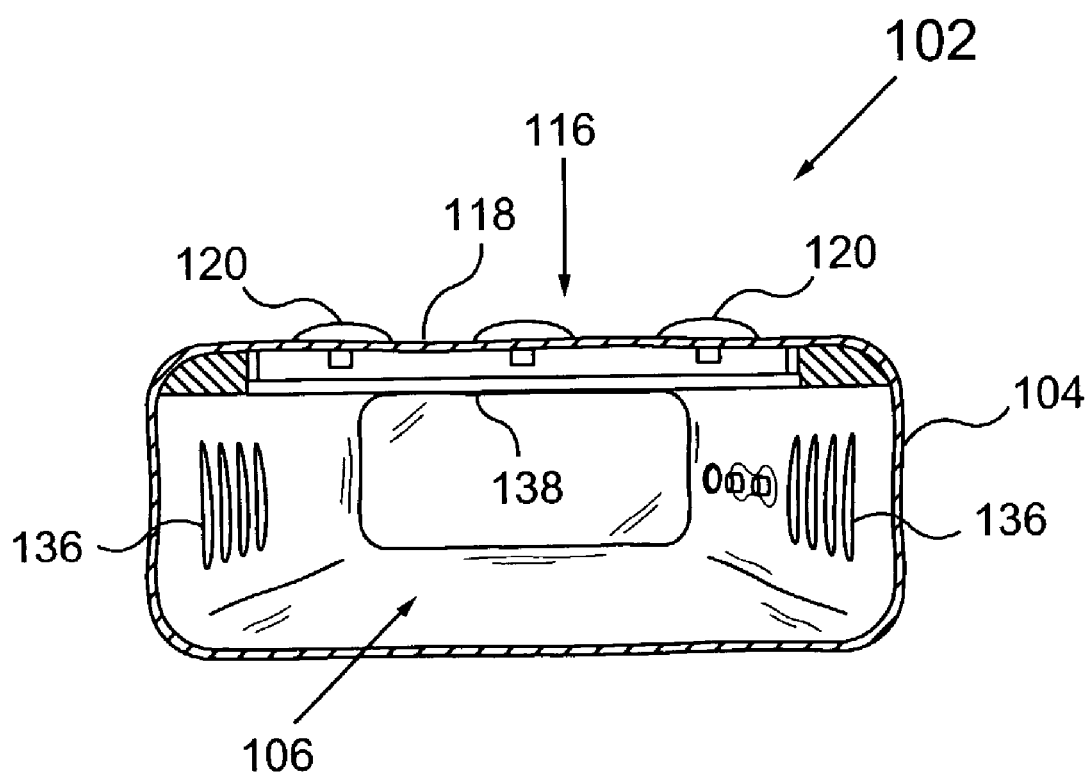
FIG. 3 shows a cross section of the enclosure taken along section line 3—3 of FIG. 1.

FIG. 3 shows a cross section of the enclosure 102 taken along section line 3—3 of FIG. 1. In one embodiment of the invention, a printed circuit board 138 proximate the interface wall 118 may be used to detect and report user input. Furthermore, the pouch 104 may include surface features 136 along the interior walls of the pouch 104 to help retain the mobile module within the cavity 106.

As mentioned above, the pouch 104 may include additional electronic circuitry. For example, the pouch 104 may contain various sensor circuits for reporting environmental conditions, such as temperature, humidity, altitude and the like, to the mobile module 108 via the connector 134. The pouch 104 may also include security and/or logic circuits for operation of the mobile module 108. For example, a Subscriber Identity Module (SIM) card may be incorporated into the pouch 104. A SIM card identifies and authenticates a network subscriber, and encrypts radio communications.

The foregoing description of the invention has been presented for purposes of illustration and description. It is not intended to be exhaustive or to limit the invention to the precise form disclosed, and other modifications and variations may be possible in light of the above teachings. Thus, the embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A protective enclosure for a mobile module that houses a transceiver and has a mobile-module electrical connector disposed on a first face surface thereof, the enclosure comprising:
   a pouch including a plurality of walls defining a module cavity and configured to receive the mobile module in supportive enclosure therein, a pouch wall of the plurality of pouch walls forming an access wall positionable in an open position to permit sliding ingress of the mobile module into the mobile cavity and in a closed position to maintain the mobile module in the supportive enclosure of the module cavity; and
   a connector configured to electrically couple the pouch with the mobile-module electrical connector of the mobile module when the access wall is positioned in the closed position.

2. The enclosure of claim 1, wherein the plurality of walls comprises an interface wall, said enclosure further comprising a pouch keypad, and wherein the pouch keypad is configured to receive user input.

3. The enclosure of claim 2, wherein the mobile module comprises a mobile-module keypad and wherein, when supported at the module cavity, user input received at the pouch keypad is translated to the mobile-module keypad.

4. The enclosure of claim 2, wherein the interface wall defines a display window.

5. The enclosure of claim 1, wherein the access wall includes a fastener configured secure the access wall in the closed position.

6. The enclosure of claim 1, wherein the access wall is biased in the closed position.

7. The enclosure of claim 1, wherein the pouch is formed from a continuous piece of material.

8. The enclosure of claim 1, wherein the pouch is formed, at least partially, from woven textiles.

9. The enclosure of claim 1, wherein the pouch is formed, at least partially, from elastic material.

10. The enclosure of claim 1, wherein the pouch is formed, at least partially, from shock absorbent material.

11. The enclosure of claim 2, wherein the interface wall further comprises an array of proximity detectors operable to provide gesture input to the mobile module.

12. A mobile telephone, the mobile telephone comprising:
    a mobile module that houses a transceiver and has a mobile-module electrical connector disposed upon a first face surface thereof the mobile moduleincluding a micro controller and a transceiver; and
    a pouch including a connector and a plurality of walls defining a module cavity and configured to receive the mobile module in supportive enclosure therein, a pouch wall of the plurality of pouch walls forming an access wall positionable in an open position to permit sliding ingress of the mobile module and in a closed position to maintain the mobile module in the supportive enclosure of the module cavity; and
    a connector configured to electrically couple the pouch with the mobile-module electrical connector of the mobile module, the when the access wall is positioned in the closed position.

13. The mobile telephone of claim 12, wherein the mobile-module comprises a mobile-module keypad and wherein, when supported at the mobile cavity, user input received at the pouch key pad is translated to the mobile-module keypad.

14. The mobile telephone of claim 12, wherein the pouch further comprises an interface wall.

15. The mobile telephone of claim 14, wherein the interface wall defines a display window.

16. The mobile telephone of claim 12, wherein the access wall includes a fastener configured secure the access wall in the closed position.

17. The mobile telephone of claim 12, wherein the access wall is biased in the closed position.

18. The mobile telephone of claim 12, wherein the pouch is formed from a continuous piece of material.

19. The mobile telephone of claim 12, wherein the pouch is formed, at least partially, from shock absorbent material.

20. The mobile telephone of claim 14, wherein the interface wall comprises a display window.

* * * * *